United States Patent
Ananthanarayanan et al.

(10) Patent No.: US 10,614,088 B2
(45) Date of Patent: Apr. 7, 2020

(54) ASSESSING VALUE OF ONE OR MORE DATA SETS IN THE CONTEXT OF A SET OF APPLICATIONS

(71) Applicant: International Business Machines Corporation, Armonk, NY (US)

(72) Inventors: Rema Ananthanarayanan, New Delhi (IN); Kalapriya Kannan, New Delhi (IN); Sameep Mehta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 15/095,424

(22) Filed: Apr. 11, 2016

(65) Prior Publication Data
US 2017/0293655 A1 Oct. 12, 2017

(51) Int. Cl.
*G06F 16/25* (2019.01)
*G06Q 10/10* (2012.01)

(52) U.S. Cl.
CPC .......... *G06F 16/25* (2019.01); *G06Q 10/10* (2013.01)

(58) Field of Classification Search
CPC ...... G06Q 40/025; G06Q 30/02; G06Q 10/00; G06F 16/24578; G06F 9/451; G06F 3/061; G06F 11/1435; G06F 16/25; G06F 16/2455; G06F 16/22; G06F 17/30604; H04N 7/17318
See application file for complete search history.

(56) References Cited

U.S. PATENT DOCUMENTS

| | | | |
|---|---|---|---|
| 7,707,192 B1* | 4/2010 | Lu | G06Q 10/00 707/687 |
| 8,392,423 B2* | 3/2013 | Belisle | G06F 11/1435 707/741 |
| 10,204,154 B2 | 2/2019 | Barday et al. | |
| 10,324,914 B2 | 6/2019 | Kumarasamy et al. | |
| 10,430,414 B2 | 10/2019 | Chang et al. | |

(Continued)

OTHER PUBLICATIONS

Shankar et al. A Relevant, Believable Approach for Data Quality Assessment. In the Proceedings of the MIT International Conference on Information Quality (IQ 2003), Oct. 2003, Boston, MA.

(Continued)

*Primary Examiner* — Etienne P Leroux
(74) *Attorney, Agent, or Firm* — Ryan, Mason & Lewis, LLP

(57) ABSTRACT

Methods, systems, and computer program products for assessing value of one or more data sets in the context of a set of applications are provided herein. A computer-implemented method includes selecting analytic applications of interest based on a characterization of data attributes of each of the available data sets; automatically determining an impact of each of the data attributes of each of the available data sets on an end value of each of the analytic applications of interest; automatically computing an amount of improvement to the end value of each of the analytic applications of interest based on inclusion of an additional data set; and automatically determining a value attributed to the additional data set based on a comparison of (i) the cost of adding the additional data set to the available data sets to (ii) the computed amount of improvement based on the inclusion of the additional data set.

20 Claims, 4 Drawing Sheets

(56) References Cited

U.S. PATENT DOCUMENTS

| | | | | |
|---|---|---|---|---|
| 2007/0043662 | A1* | 2/2007 | Lancaster | G06Q 40/025 |
| | | | | 705/38 |
| 2009/0030913 | A1* | 1/2009 | Gyure | G06F 9/451 |
| 2012/0158678 | A1 | 6/2012 | McGraw et al. | |
| 2013/0006748 | A1* | 1/2013 | Horvitz | G06Q 30/02 |
| | | | | 705/14.39 |
| 2013/0263147 | A1* | 10/2013 | Zhang | G06F 3/061 |
| | | | | 718/103 |
| 2014/0379417 | A1 | 12/2014 | Gujjewar et al. | |
| 2015/0120961 | A1* | 4/2015 | Mao | H04N 7/17318 |
| | | | | 709/240 |
| 2015/0326601 | A1* | 11/2015 | Grondin | G06F 16/24578 |
| | | | | 726/25 |

OTHER PUBLICATIONS

Even et al. Value-Driven Data Quality Assessment. Tenth International Conference on Information Quality (ICIQ'05). 2005. MIT, Cambridge, MA, USA.

* cited by examiner

ASSESSING VALUE OF ONE OR MORE DATA SETS IN THE CONTEXT OF A SET OF APPLICATIONS

FIELD

The present application generally relates to information technology, and, more particularly, to data management.

BACKGROUND

Many enterprises commonly run multiple analytical applications for purposes of various predictive, preventive, and/or comprehensive analyses. In many instances, the data associated with such analyses are increasingly derived from many sources, and are not restricted to enterprise-owned data. Accordingly, enterprises may seek to pay for access to certain data. Similarly, enterprises may have certain data available that might be of value to other enterprises and a willingness to share such data, but do not possess means of pricing such data.

SUMMARY

In one embodiment of the present invention, techniques for assessing value of one or more data sets in the context of a set of applications are provided. An exemplary computer-implemented method can include selecting, from a collection of multiple analytic applications, one or more analytic applications of interest based on a characterization of one or more data attributes of each of one or more available data sets in relation to each of the analytic applications in the collection. Such a method can also include automatically determining an impact of each of the data attributes of each of the available data sets on an end value of each of the analytic applications of interest, and automatically computing an amount of improvement to the end value of each of the analytic applications of interest based on an inclusion of an additional data set. Further, such a method can include automatically determining a value attributed to the additional data set based on a comparison of (i) the cost of adding the additional data set to the one or more available data sets to (ii) the computed amount of improvement to the end value of each of the analytic applications of interest based on the inclusion of the additional data set.

In another embodiment of the invention, an exemplary computer-implemented method can include automatically cataloging one or more available data sets from a collection of multiple data sets, and selecting, from a collection of multiple analytic applications, one or more analytic applications of interest based on one or more data requirements for each of the multiple analytic applications, wherein the one or more data requirements comprise the identity of each required data set. Such a method can also include automatically determining an impact of each of the data attributes of each of the available data sets on an end value of each of the analytic applications of interest, automatically computing an amount of improvement to the end value of each of the analytic applications of interest based on an inclusion of an additional data set. Further, such a method can also include automatically determining a value attributed to the additional data set based on a comparison of (i) the cost of adding the additional data set to the one or more available data sets to (ii) the computed amount of improvement to the end value of each of the analytic applications of interest based on the inclusion of the additional data set.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1A:
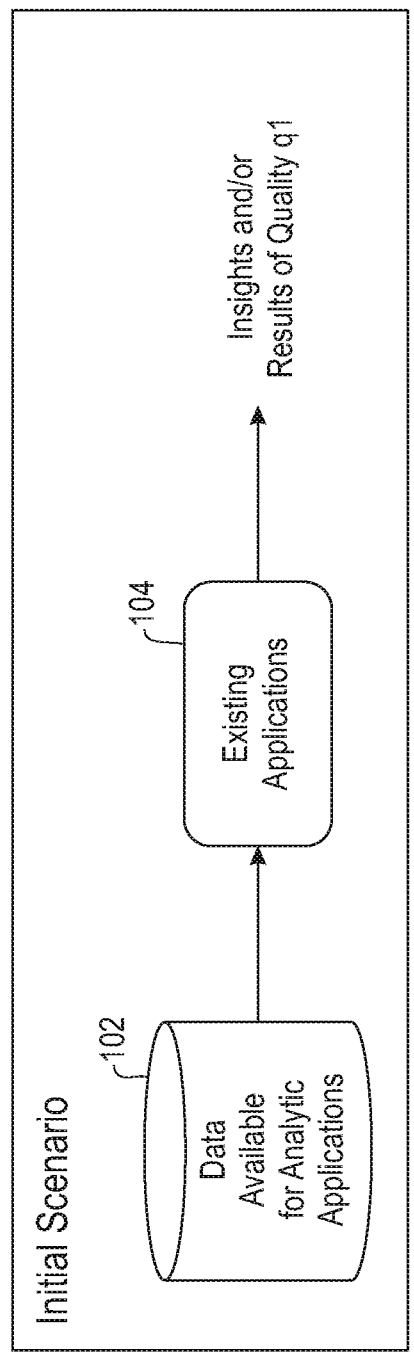
FIG. 1A and FIG. 1B are diagrams illustrating system architecture, according to an embodiment of the invention.

As described herein, an embodiment of the present invention includes assessing value of one or more data sets in the context of a set of analytic applications. At least one embodiment of the invention can include assessing the value of new data sets that may become available vis-à-vis current and future analytical application requirements. Additionally, at least one embodiment of the invention can include assessing the value of available data to determine the pricing parameters for such data and to assess storage cost trade-offs with respect to such data.

As further detailed herein, one or more embodiments of the invention include characterizing an impact of each of one or more data attributes (such as format, correctness, completeness, etc.) on the end-value of a specific analytic application by determining quality aspects of each of one or more existing data sets. By way of example, quality aspects can exist on multiple dimensions, depending on the specific application. One example quality aspect can include how ready an item of data is for use in a specific application; that is, whether the data can be used as-is or whether the item of data has to be pre-processed before it is used. Another example quality aspect can include how reliable an item of data is in terms of accuracy, and whether all of the information is reliable and/or what is the relevant window of error in connection with the information. Yet another example quality aspect can include how complete a set of data is, and whether the set includes the entire population of interest or relevance for a specific application. As further detailed herein, additional quality aspects can include aspects related to timeliness of the data and whether items of data are outdated.

One or more embodiments of the invention can also include determining the value of a new data set by applying one or more information processing methods to the new data set. The information processing methods can include methods that compute the recall and precision of the data sets—the old data sets and the combined data sets. The improvement in recall or precision brought about because of the new data can determine the value of the new data sets. Such value attributed to a new data set can be, for example, in terms of the value the new data set adds to a current analysis and/or in terms of the improvement the new data set brings to a current analysis.

Two examples of how the values are quantified include precision and recall. Precision is an indication of how correct the set of data is, while recall is an indication of how much of the relevant data have been covered. For instance, the initial precision may be 60%, and after the new data set is added, the precision may increase to 70%. At the secondary level, the value is computed in terms of how much such an incorporation increases the value of the analytical application. For example, for an application that suggests recommendations to customers based on the customers' personal profiles, at 60% accuracy, the hit rate may be 5%, and at 70% accuracy, the hit rate may be 7%. It should be appreciated that such figures are merely for purposes of example and/or illustration, and that one or more embodiments of the invention can include utilizing other quantitative measures to quantify the value added by new data sets.

Additionally, at least one embodiment of the invention, as detailed herein, can include measuring improvements to insights derived from a given analysis in terms of improvements to one or more characteristics or features of the analytics output. Further, one or more embodiments of the invention can include enabling a user to assign value to additional derived insights. Also, based on improvement to analytics arising from new data, at least one embodiment of the invention can include determining a cost-value trade-off pertaining to the new data.

Such a trade-off can be determined, as detailed herein, in multiple ways. In one example, for every data set that adds value to an analytic application, the enterprise has a cost of obtaining that data set. The data set can be obtained via effort spent on gathering the data, such as, for instance, running surveys, purchasing the data set outright from sellers, or searching the web for the data set and making it usable by proper pre-processing and extraction. With higher cost, it is possible that higher quality data may be available—data that are more accurate, more recent or complete, or data that are better cleansed and curated and ready for use. The value of a specific data set can be qualified in terms of the value of the applications that are facilitated by the data set. A data set of purchase histories for a set of consumers increases the value of a recommender system for recommending new products for sale for the same consumer set. A domain expert can specify how much the effectiveness of the recommender system increases with increasing quality of the data, which can then translate into an increase in value of the application. Further, depending on the application in question, beyond a certain level, the increasing accuracy may not yield more gains in terms of the prediction capability of the data. In this manner, an association can be made between the cost of the data, the value obtained by using the data in applications, and whether the value starts tapering-off beyond a certain cost for the data. Once such an association is made, it can be presented as a look-up table that, for example, lists the cost in column 1 and the value in column 2, or a 2-dimensional plot of cost on the x-axis and value on the y-axis. In one or more embodiments of the invention, the cost of data can be related to the quality, and the exact relationship therebetween can be linear or otherwise. Similarly, the value of the data can be related to the insight(s) obtained as a result of the new data.

One or more embodiments of the invention can include a number of actions being carried out at an enterprise level. For example, such embodiments can include cataloging the available data sets, as well as cataloging the analytic applications of interest (both current applications and applications planned for future use). The data sets that the enterprise is cataloging can include data sets owned by the enterprise, as well as data sets that are available to the enterprise either for purchase or use from other sources, or from searching public domains on the web. The data sets owned by the enterprise can be available in-house or externally, such as, for instance, from a service provider hosting data on the cloud.

Additionally, one or more embodiments of the invention can include defining the data requirements for the analytical applications under consideration (that is, the applications that have been catalogued). Such data requirements can include, for example, the data sets that are required for implementation of the particular applications, and the components of each data set that are to be used. In at least one embodiment of the invention, components of a data set are akin to the various columns that comprise a database table in a relational database. For instance, the components of an employee database can include the name of the employee, the identification number of the employee, as well as the date of joining, title, highest degree earned and current role.

Further, such embodiments can also include characterizing the one or more quality aspects of the data sets required for each application. Such characterizations can be made, for example, in the context of timeliness, the readiness for use in terms of amount of pre-processing required to clean the data and/or prepare the data in a specific format for use by an application. An example of cleaning data can include a scenario wherein a data set has duplicate values, and the data set consequently needs to be cleaned to make sure each unique item is counted only once. Methods can be defined, for example, to characterize the quality aspects of a data set for a specific application. For instance, the amount of pre-processing required can be based on whether the information required is available in a structured format or has to be extracted from an unstructured format. Another example can include a scenario wherein the application requires the data from a relational database, while the data are available, as a social media stream or a collection of feedback forms in semi-structured text. Additionally, timeliness can be determined based on how close the data are to the time period of interest. For example, if an address database of customers was compiled a few years earlier, such a database might not be the most accurate way of reaching the customers on the present date.

Similarly, one or more embodiments of the invention can include characterizing the impact of each of one or more data attributes (associated with the required data sets) on the end value of the analysis. An attribute, as used here, is extrinsic to the data set and defines some property of the data set. For instance, structured data and unstructured data are two types of values for the attribute 'data format,' while text, numeric and media are three values for the attribute 'data type.' The quality aspect is closely tied to the application at hand. Also, the impact of such attributes can be characterized, for example, by domain experts.

Additionally, such embodiments can also include computing the improvement in value of the output of each application and/or any new possible outputs of each application based on new data sets. The value of a new data set can further be described in accordance with such computations. By way of illustration, consider the following example equations for assessing improvement in performance:

$$\text{recall, } r_1 = \frac{\text{\# of relevant data points retrieved}(n_1)}{\text{total \# of relevant data points in the current set}(n_{1\_total})}$$

$$\text{recall, } r_2 = \frac{\text{\# of relevant data points retrieved}(n_{new})}{\text{total \# of relevant data points in the new set}(n_{new\_total})}$$

$$\text{recall, } r_{new} = \frac{\text{\# of relevant data points retrieved in the new set}}{\text{total \# of relevant data points in the new set}}$$

$$\text{recall, } r_{new} = \frac{n_1 \cup n_{new}}{n_{1\_total} \cup n_{new\_total}}$$

The above is an example of assessing improvement based on one attribute (the attribute of recall, in this instance). It is to be appreciated that one or more similar extensions can be implemented to encompass and/or incorporate other attributes of a particular data set.

As noted above, one or more embodiments of the invention include characterizing the impact of one or more data attributes associated with required data sets on the end value of a particular application analysis. Such attributes can be extrinsic to the given data set as well as highly correlated to the data set and the context in which the data set is being considered. Further, the specific application and/or context can determine which of a collection of attributes might assume significance.

Such attributes can include, for example, the format of the data (which can be related to the pre-processing costs associated with the data), privacy considerations arising from the data, the constancy of the data (that is, how frequently the data are updated) the value of the data as the data age, correctness of the data, and the completeness of the data.

Figure 1B:
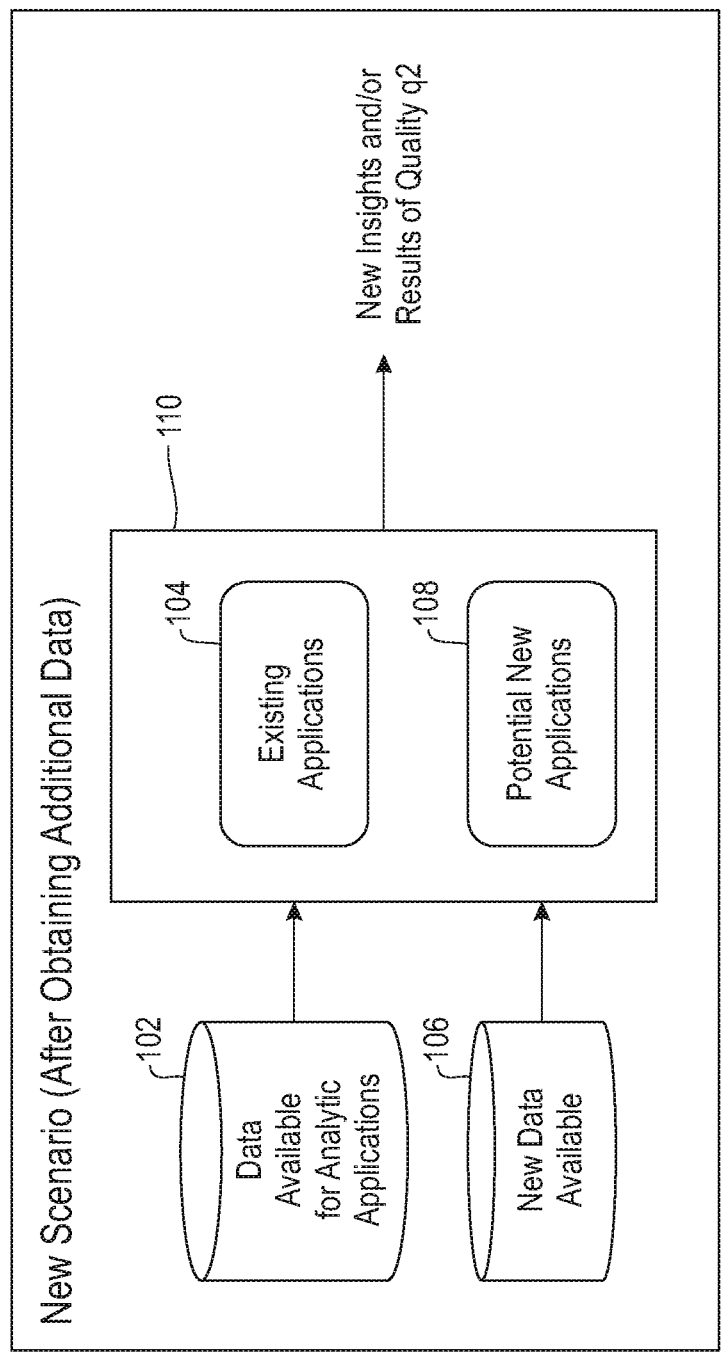

FIG. 1A and FIG. 1B are diagrams illustrating system architecture, according to an embodiment of the invention. By way of illustration, FIG. 1A depicts an initial scenario including a database 102 containing data available for analytic applications, and a set of existing applications 104. As depicted in FIG. 1A, data from the database 102 are provided to and/or obtained by the set of existing applications 104, which thereby use the data to generate insights and/or results pertaining to a quality (q 1).

By way of illustration, FIG. 1B depicts a new or subsequent scenario (wherein additional data have been obtained) including the database 102 containing data available for analytic applications, and a database 106 containing the new available data. FIG. 1B also depicts an application component 110 which includes the set of existing applications 104 and a set of one or more potential new applications 108. As depicted in FIG. 1B, data from the database 102 and data from the new database 106 are provided to and/or obtained by the application component 110, which thereby use the data to generate insights and/or results pertaining to a quality (q2), such that, in a comparative sense, q2 is better than q1.

As detailed herein, at least one embodiment of the invention can include cataloging the various data sets available across the various applications currently in use, as well as enumerating the various attributes and/or features of the data sets (such as the various fields of the data sets, the various data types, etc.). For instance, a data set containing customer information might include fields such as customer name, customer email address, previous purchases, preferred contact methods, current deals, etc.

Additionally, at least one embodiment of the invention also includes cataloging analytic applications of interest. In such an embodiment, this cataloging step can further include, for each application (current and future) of interest, enumerating the data sets required as well as the attributes of each data set that are to be used. Also, for each attribute, one or more embodiments of the invention can include enumerating the characteristics of that attribute as well as the impact that the attribute can have on the outcome of a particular analysis. For each such characteristic, at least one embodiment of the invention can include defining a value function, which can be carried out in terms of a line chart (or any other chart), a look-up table, a formula, etc.

Consider, by way of illustration, a first example that includes a churn prediction application for a service, such as a network services provider, in a given geographic area. By way of example, the initial data sets may include customer information and feedbacks, comments and/or complaints received through regular channels such as call centers and online feedback forms. Churn prediction for a specific customer or customer segment can, at this point, be carried out with a certain probability. Subsequently, if information pertaining to the comments on this service is received from social media as well, this may help to increase the accuracy of the churn prediction. Hence, a value can be associated for this additional information, based on the value to the company, from being able to more accurately predict the churn. However, there is a cost associated with obtaining the information from social media (for example, the information may be purchased, or it may be downloaded and brought into the required format for usage). Accordingly, by knowing the additional value, the enterprise is better able to assess whether the cost of obtaining the additional data is worth incurring.

Additionally, consider a second example of credit card risk assessment, wherein a credit card company assesses the credit risk of a potential customer based on the inputs of current income and a period of stay at a current location. In this example, the initial data sets available only include data on current income. The data on period of stay in the current address are not available, or are incomplete. Based on this, the credit card company is able to assess the credit risk of customers with a specific probability. Also, if a second data set is available that has, for the customers in the first set, additional information on the customers' place of stay during the last few years, this information will help in improving the accuracy of the risk prediction algorithm, and hence the insights derived, which in turn relate to the value of the associated data. Here again, the enterprise has a better way to assess the value of the data in question, for the specific application, vis-à-vis the cost.

Figure 2:
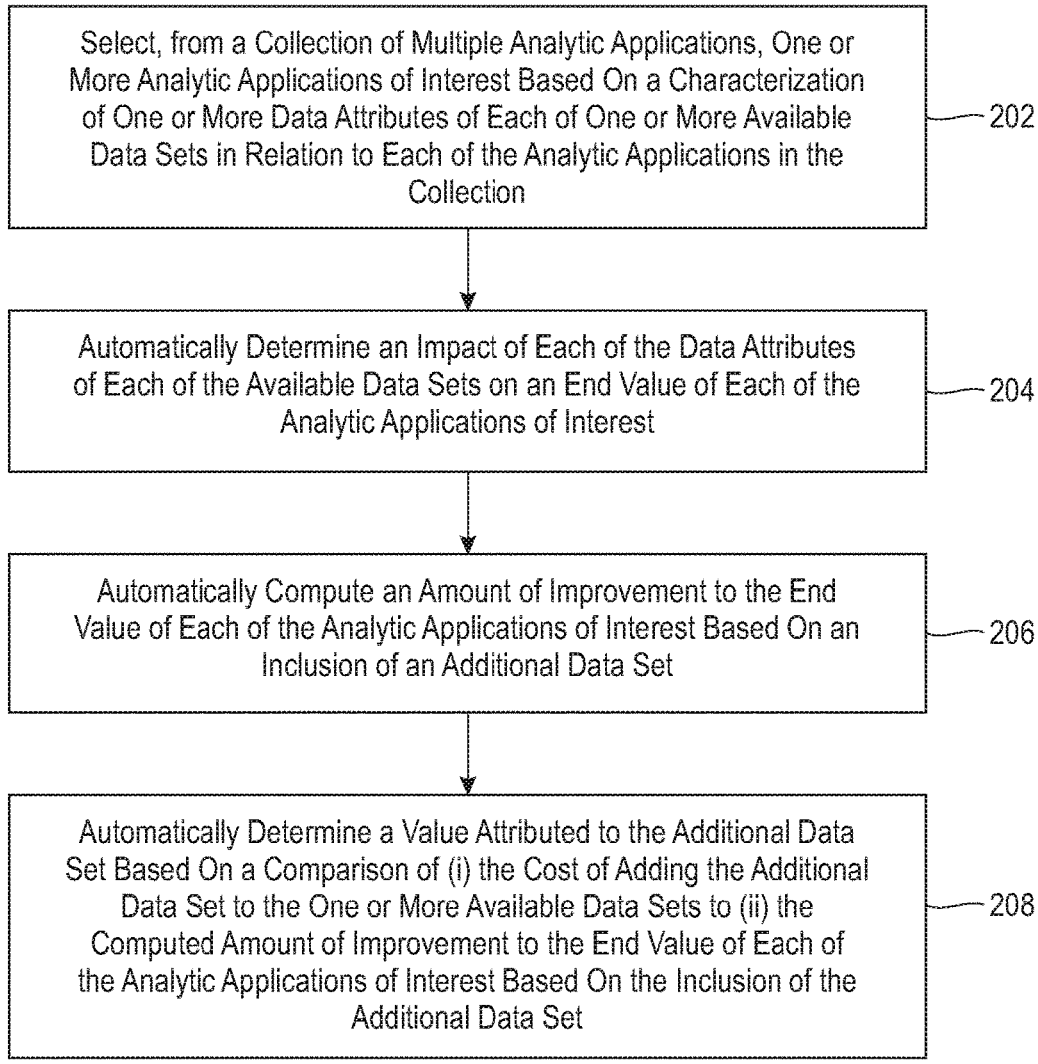
FIG. 2 is a flow diagram illustrating techniques, according to an embodiment of the invention.

FIG. 2 is a flow diagram illustrating techniques, according to an embodiment of the present invention. Step 202 includes selecting, from a collection of multiple analytic applications, one or more analytic applications of interest based on a characterization of one or more data attributes of each of one or more available data sets in relation to each of the analytic applications in the collection. The one or more data attributes can include format of the data in each of the available data sets, wherein the format of the data can also include pre-processing costs associated with the format. Additionally, the one or more data attributes can include one or more privacy considerations arising from the data in each of the available data sets, constancy of the data in each of the available data sets, status of the data in each of the available data sets as each of the available data sets ages, correctness of the data in each of the available data sets, and/or completeness of the data in each of the available data sets. As also detailed herein, the one or more analytic applications of interest can include one or more analytic applications of interest currently in-use and/or one or more analytic applications of interest targeted for future use.

Step 204 includes automatically determining an impact of each of the data attributes of each of the available data sets on an end value of each of the analytic applications of interest. In one or more embodiments of the invention, the impact can include a domain-specific impact. Also, determining the impact of each of the data attributes can include implementing a look-up table and/or a plot.

Step 206 includes automatically computing an amount of improvement to the end value of each of the analytic applications of interest based on an inclusion of an additional data set. Computing the amount of improvement can include determining an impact of each of one or more data attributes of the additional data sets on the end value of each of the analytic applications of interest.

Step 208 includes automatically determining a value attributed to the additional data set based on a comparison of (i) the cost of adding the additional data set to the one or more available data sets to (ii) the computed amount of improvement to the end value of each of the analytic applications of interest based on the inclusion of the additional data set.

The techniques depicted in FIG. 2 can also include cataloging the one or more available data sets from a collection of multiple data sets, wherein said cataloging can include creating an application programming interface to (i) populate a data set catalog and (ii) query the data set catalog for available data sets. Additionally, at least one embodiment of the invention can include defining one or more data requirements for each of the analytic applications of interest, wherein the one or more data requirements comprise (i) identity of each required data set and/or (ii) identity of each component of each required data set.

Also, an additional embodiment of the invention includes automatically cataloging one or more available data sets from a collection of multiple data sets, and selecting, from a collection of multiple analytic applications, one or more analytic applications of interest based on one or more data requirements for each of the multiple analytic applications, wherein the one or more data requirements comprise the identity of each required data set. Such an embodiment can also include automatically determining an impact of each of the data attributes of each of the available data sets on an end value of each of the analytic applications of interest, automatically computing an amount of improvement to the end value of each of the analytic applications of interest based on an inclusion of an additional data set. Further, such an embodiment can also include automatically determining a value attributed to the additional data set based on a comparison of (i) the cost of adding the additional data set to the one or more available data sets to (ii) the computed amount of improvement to the end value of each of the analytic applications of interest based on the inclusion of the additional data set.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
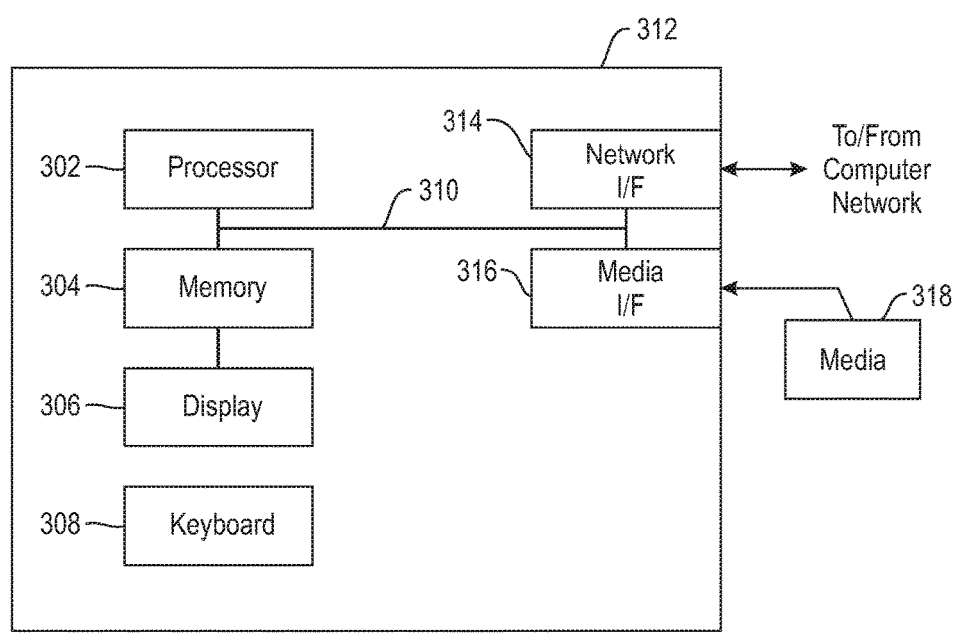
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, embodiments of the present invention are capable of being implemented in conjunction with any type of computing environment now known or later developed. For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, characterizing the impact of data attributes on the end value of an application and determining the value of a new data set by applying information processing methods on the new data set.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   cataloging (i) one or more available datasets and (ii) one or more analytic applications of interest;
   defining, for each given one of the analytic application of interests, one or more data requirements, wherein the one or more data requirements comprise at least one of (i) identity of each required data set to implement the given analytic application of interest and (ii) identity of each component of each required data set used by the given analytic application of interest;
   obtaining a characterization of one or more data attributes of each of one or more available data sets in relation to the one or more data requirements of each of the analytic applications of interest;
   automatically determining an impact of each of the data attributes of each of the available data sets on an end value of each of the analytic applications of interest based at least in part on the characterization of each of the one or more data attributes of each of one or more available data sets;
   automatically computing an amount of improvement to the end value of each of the analytic applications of interest based on an inclusion of an additional data set, wherein said computing is based at least in part on the determined impacts of the data attributes; and
   automatically determining a value attributed to the additional data set based on a comparison of (i) the cost of adding the additional data set to the one or more available data sets to (ii) the computed amount of improvement to the end value of each of the analytic applications of interest based on the inclusion of the additional data set;
   wherein the method is carried out by at least one computing device.

2. The computer-implemented method of claim 1, wherein said impact comprises a domain-specific impact.

3. The computer-implemented method of claim 1, wherein said determining the impact of each of the data attributes comprises implementing a look-up table and/or a plot.

4. The computer-implemented method of claim 1, wherein the one or more data attributes comprise a format of the data in each of the available data sets.

5. The computer-implemented method of claim 4, wherein the characterization of the format of the data corresponds to a pre-processing cost associated with the format.

6. The computer-implemented method of claim 1, wherein the one or more data attributes comprise one or more privacy considerations arising from the data in each of the available data sets.

7. The computer-implemented method of claim 1, wherein the one or more data attributes comprise constancy of the data in each of the available data sets.

8. The computer-implemented method of claim 1, wherein the one or more data attributes comprise status of the data in each of the available data sets as each of the available data sets ages.

9. The computer-implemented method of claim 1, wherein the one or more data attributes comprise correctness of the data in each of the available data sets.

10. The computer-implemented method of claim 1, wherein the one or more data attributes comprise completeness of the data in each of the available data sets.

11. The computer-implemented method of claim 1, wherein said cataloging comprises:
    cataloging the one or more available data sets from a collection of multiple data sets.

12. The computer-implemented method of claim 11, wherein said cataloging comprises creating an application programming interface to (i) populate a data set catalog and (ii) query the data set catalog for available data sets.

13. The computer-implemented method of claim 1, wherein the one or more analytic applications of interest comprise one or more analytic applications of interest currently in-use.

14. The computer-implemented method of claim 1, wherein the one or more analytic applications of interest comprise one or more analytic applications of interest targeted for future use.

15. A computer program product comprising a computer readable storage medium having program instructions embodied therewith, the program instructions executable by a device to cause the device to:
    catalog (i) one or more available datasets and (ii) one or more analytic applications of interest;
    define, for each given one of the analytic application of interests, one or more data requirements, wherein the one or more data requirements comprise at least one of (i) identity of each required data set to implement the given analytic application of interest and (ii) identity of each component of each required data set used by the given analytic application of interest;
    obtain a characterization of one or more data attributes of each of one or more available data sets in relation to the one or more data requirements of each of the analytic applications of interest;
    automatically determine an impact of each of the data attributes of each of the available data sets on an end value of each of the analytic applications of interest;

automatically compute an amount of improvement to the end value of each of the analytic applications of interest based on an inclusion of an additional data set based at least in part on the characterization of each of the one or more data attributes of each of one or more available data sets; and automatically determine a value attributed to the additional data set based on a comparison of (i) the cost of adding the additional data set to the one or more available data sets to (ii) the computed amount of improvement to the end value of each of the analytic applications of interest based on the inclusion of the additional data set.

16. The computer program product of claim 15, wherein said impact comprises a domain-specific impact.

17. The computer program product of claim 15, wherein said determining the impact of each of the data attributes comprises implementing a look-up table and/or a plot.

18. The computer program product of claim 15, wherein the one or more data attributes comprise a format of the data in each of the available data sets.

19. A system comprising:
a memory; and
at least one processor coupled to the memory and configured for:
  cataloging (i) one or more available datasets and (ii) one or more analytic applications of interest;
  defining, for each given one of the analytic application of interests, one or more data requirements, wherein the one or more data requirements comprise at least one of (i) identity of each required data set to implement the given analytic application of interest and (ii) identity of each component of each required data set used by the given analytic application of interest;
obtaining a characterization of one or more data attributes of each of one or more available data sets in relation to the one or more data requirements of each of the analytic applications of interest;
  automatically determining an impact of each of the data attributes of each of the available data sets on an end value of each of the analytic applications of interest based at least in part on the characterization of each of the one or more data attributes of each of one or more available data sets;
automatically computing an amount of improvement to the end value of each of the analytic applications of interest based on an inclusion of an additional data set; and
automatically determining a value attributed to the additional data set based on a comparison of (i) the cost of adding the additional data set to the one or more available data sets to (ii) the computed amount of improvement to the end value of each of the analytic applications of interest based on the inclusion of the additional data set.

20. A computer-implemented method, comprising:
automatically cataloging one or more available data sets from a collection of multiple data sets;
selecting, from a collection of multiple analytic applications, one or more analytic applications of interest based on one or more data requirements for each of the multiple analytic applications, wherein the one or more data requirements comprise the identity of each required data set;
automatically determining impact of each of the data attributes of each of the available data sets on an end value of each of the analytic applications of interest;
automatically computing an amount of improvement to the end value of each of the analytic applications of interest based on an inclusion of an additional data set; and
automatically determining a value attributed to the additional data set based on a comparison of (i) the cost of adding the additional data set to the one or more available data sets to (ii) the computed amount of improvement to the end value of each of the analytic applications of interest based on the inclusion of the additional data set;
wherein the steps are carried out by at least one computing device.

* * * * *